United States Patent
Buzby et al.

(10) Patent No.: US 6,868,483 B2
(45) Date of Patent: *Mar. 15, 2005

(54) BALANCED ACCESS TO PREVENT GATEWORD DOMINANCE IN A MULTIPROCESSOR WRITE-INTO-CACHE ENVIRONMENT

(75) Inventors: Wayne R. Buzby, Phoenix, AZ (US); Charles P. Ryan, Phoenix, AZ (US)

(73) Assignee: Bull HN Information Systems Inc., Billerica, MA (US)

( * ) Notice: Subject to any disclaimer, the term of this patent is extended or adjusted under 35 U.S.C. 154(b) by 119 days.

This patent is subject to a terminal disclaimer.

(21) Appl. No.: 10/256,289

(22) Filed: Sep. 26, 2002

(65) Prior Publication Data

US 2004/0064645 A1 Apr. 1, 2004

(51) Int. Cl.[7] .............................................. G06F 12/00
(52) U.S. Cl. ...................... 711/121; 711/130; 711/135; 711/138; 711/141; 711/142; 711/143; 711/147; 711/118; 711/152
(58) Field of Search .......................... 711/118–122, 130, 711/135, 138, 141, 142, 143, 147, 152, 153, 158, 167, 168, 151

(56) References Cited

U.S. PATENT DOCUMENTS

| | | | | |
|---|---|---|---|---|
| 5,581,782 | A | * 12/1996 | Sarangdhar et al. | ........ 710/119 |
| 6,055,605 | A | * 4/2000 | Sharma et al. | ............... 711/130 |
| 6,314,499 | B1 | * 11/2001 | Kermani | ...................... 711/147 |
| 6,401,176 | B1 | * 6/2002 | Fadavi-Ardekani et al. | 711/151 |
| 6,484,272 | B1 | * 11/2002 | Egolf et al. | ................... 714/30 |
| 6,760,811 | B2 | * 7/2004 | Buzby et al. | ............... 711/130 |

* cited by examiner

Primary Examiner—Matthew Kim
Assistant Examiner—Zhou H. Li
(74) Attorney, Agent, or Firm—James H. Phillips

(57) ABSTRACT

In a multiprocessor data processing system including: a main memory; at least first and second shared caches; a system bus coupling the main memory and the first and second shared caches; at least four processors having respective private caches with the first and second private caches being coupled to the first shared cache and to one another via a first internal bus, and the third and fourth private caches being coupled to the second shared cache and to one another via a second internal bus; method and apparatus for preventing hogging of ownership of a gateword stored in the main memory and which governs access to common code/data shared by processes running in at least three of the processors. Each processor includes a gate control flag. A gateword CLOSE command, establishes ownership of the gateword in one processor and prevents other processors from accessing the code/data guarded until the one processor has completed its use. A gateword OPEN command then broadcasts a gateword interrupt to set the flag in each processor, delays long enough to ensure that the flags have all been set, writes an OPEN value into the gateword and flushes the gateword to main memory. A gateword access command executed by a requesting processor checks its gate control flag, and if set, starts a fixed time delay after which normal execution continues.

16 Claims, 3 Drawing Sheets

BALANCED ACCESS TO PREVENT GATEWORD DOMINANCE IN A MULTIPROCESSOR WRITE-INTO-CACHE ENVIRONMENT

FIELD OF THE INVENTION

This invention relates to the art of multiprocessing and, more particularly, to method and apparatus for controlling gateword acquisition in a multiprocessor write-into-cache environment.

BACKGROUND OF THE INVENTION

An operating system for a multiprocessor environment can have several processes that are common code elements used by all processors. Similarly, several processes may share common data sets used by all processor. In a multiprocessor system having a "write-into-cache" architecture, gatewords are used in a software controlled process to prevent more than one processor from executing common code or accessing shared data at the same time. A unique gateword that is assigned to a given process or data set is tested to assure that no other processor is currently executing or accessing the information a given processor is requesting. This procedure prevents a detrimental activity from occurring when a processor changes data at the same time another processor is using it.

In a write-into-cache architecture, the gateword for given code or data is siphoned from one processor to another while testing for the gateword to be OPENed (made available). This requires data siphoning between caches. The siphoning process introduces significant delays when the copied data must be siphoned through multiple levels of cache. Thus, in modern multiprocessing systems, not all processors are equal when it comes to data siphoning delays. The more cache mechanisms a given gateword must pass through, the longer it will take the gateword to arrive at the requesting processor.

A process decision cannot be made until a siphoned gateword arrives and can be tested by a processor seeking access to the code/data guarded by the gatword. The delays can be sufficiently excessive as to prevent a processor with long siphon delays in a given condition from timely acquiring the relevant gateword before another processor has overwritten (and thus CLOSEd) it. This undesirable result is commonly called "hogging".

Different schemes to work around the hogging problem use software delays before the gateword is retested, but these delays are made without any assurance that a processor board (carrying a plurality of CPUs) that currently retains the gateword will relinquish access to a CPU on another, "gateword-starved", board. Other schemes use interrupts to broadcast the identity of the processor board that currently has control of the gateword so that CPUs on the same board will detect this and then delay longer, giving CPUs on another board (gateword starved board) a chance to access the gateword. Still other mechanisms use a dedicated processor to maintain a gateword queue, while yet other systems devote hardware in the form of FIFO arrays or fast logic across board boundaries in attempts to create equal access in a multiprocessor environment.

Software systems have typically relied on hardware to mediate the gateword access controls using a read-alter-rewrite method of access. Specific gate handling instructions used this mechanism which was satisfactory when processors in a multiprocessor system had substantially the same access times within the context of processor clock speeds. But, as hardware designs became more complex and processor speeds increased, it also became more difficult to attain the interface speeds necessary to handle the gateword access priority without a system performance penalty. The responsibility for access to heavily used gatewords has gradually become more dependent on software mechanisms as software designers become increasingly aware of the problems that can occur as a result of the hogging effect.

Most software techniques employed to handle the hogging problem are of fixed delay types that will always delay access to a gateword whether a delay is required or not. Fixed delay techniques significantly reduce system performance, and this type of software technique must be tuned to the system architecture and may even have to be tuned to various gates within the operating system.

One highly effective solution (essentially different from the solution provided by the present invention) for the hogging problem is disclosed and claimed in our copending application application Ser. No. 10/219,644, filed Aug. 15, 2002, and entitled: "Gateword Acquisition in a Multiprocessor Write-Into-Cache Environment". The solution set forth in that application, however, requires the creation of at least one, and typically two, new operating system instructions. This requirement has certain potential drawbacks. Programmers must be informed about and understand the use of the new commands. Legacy software must be revised to include the command(s) in order to enjoy the anti-hogging benefits. There may not be sufficient unused operation codes in the instruction set, or even in the hardware, to accommodate the new instructions.

Accordingly, it would be highly desirable to provide hardware assistance in effecting software handling of gateword control in a complex multiple processor system with a write-into-cache architecture without the need to add new instructions to the operating system repertoire. The present invention achieves this objective.

DESCRIPTION OF THE DRAWING SET

DESCRIPTION OF THE PREFERRED EMBODIMENT(S)

Figure 1:
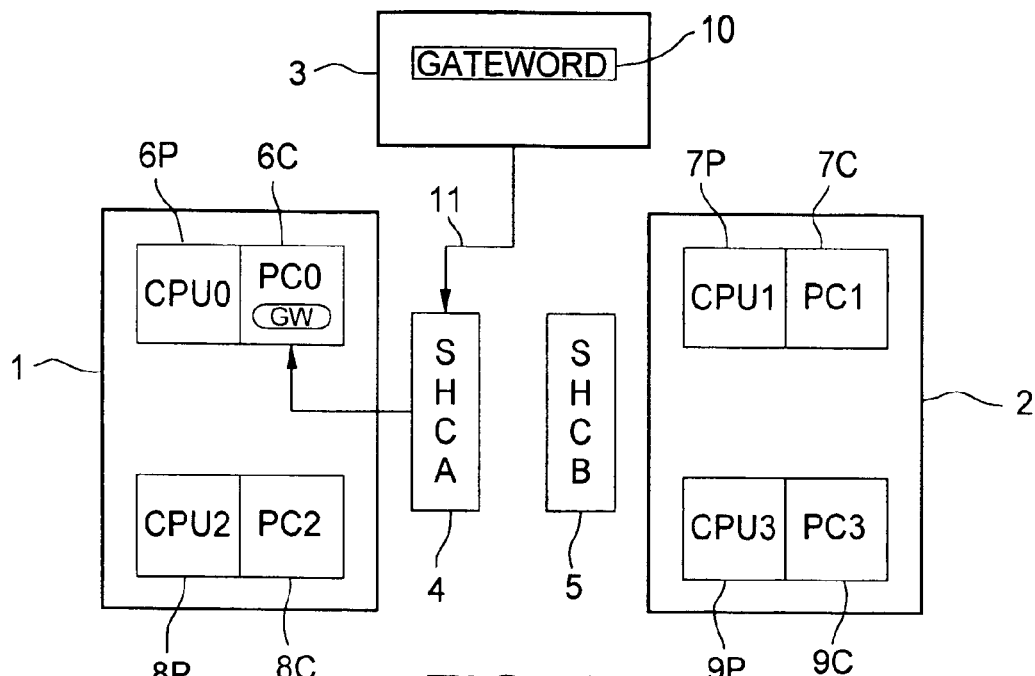
FIG. 1 is a block diagram of a simplified multiprocessor system showing a condition in which a first processor obtains ownership of a gateword stored in a memory.
Figure 2:
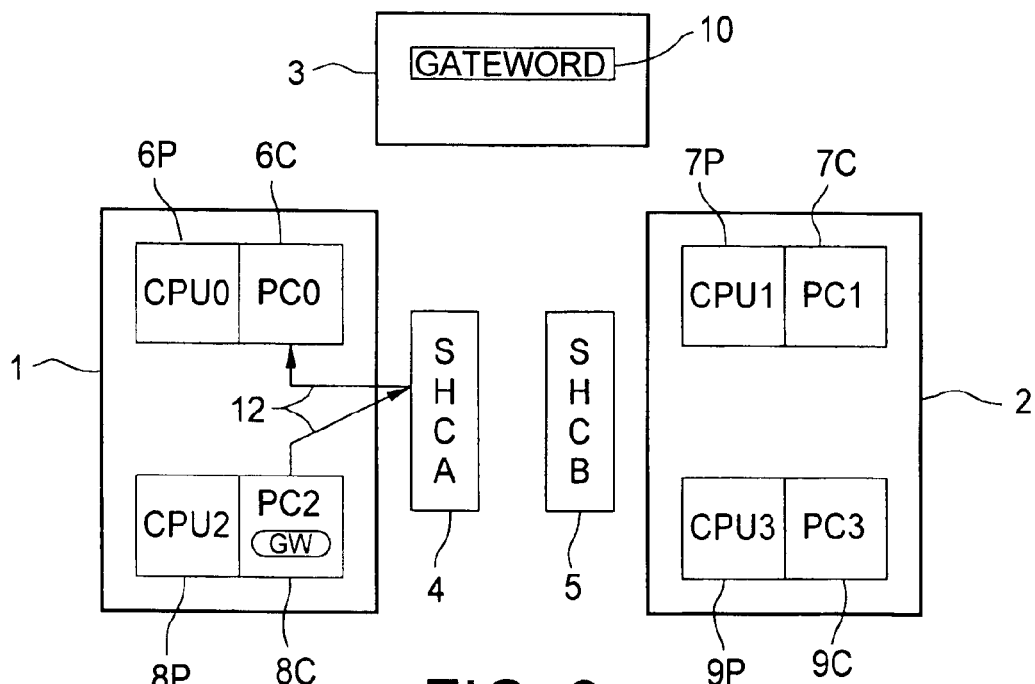
FIG. 2 is a block diagram of the multiprocessor system of FIG. 1 showing a condition in which a second processor on the same circuit board as the first processor is seeking ownership of the same gateword.
Figure 3:
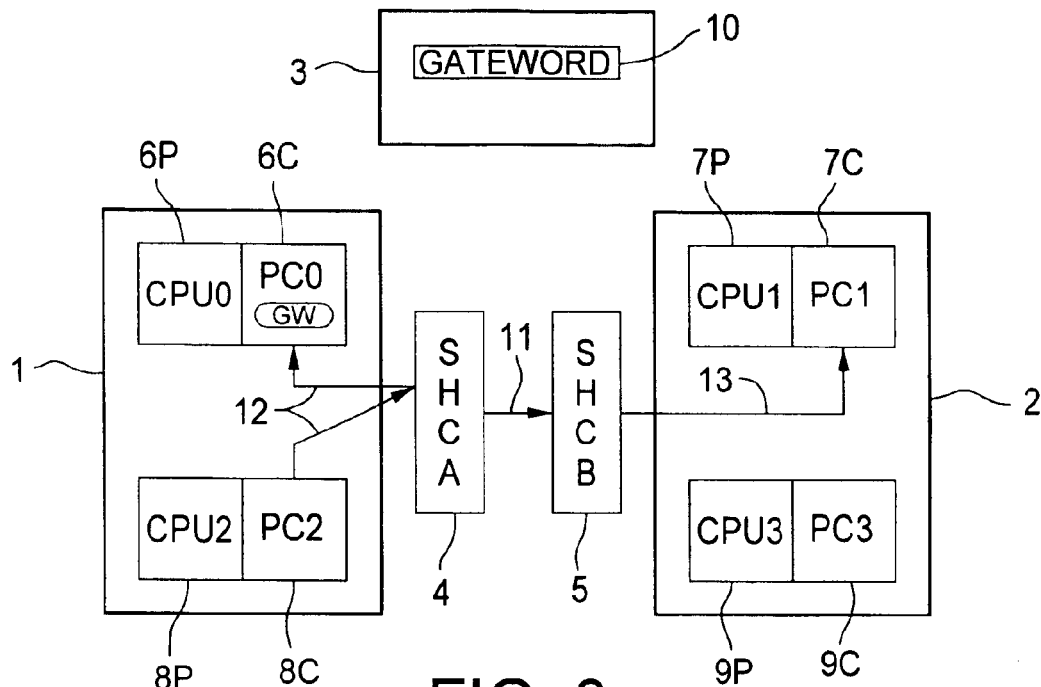
FIG. 3 is a block diagram of the multiprocessor system of FIG. 1 showing a condition in which processors on different circuit boards are contending for ownership of same the gateword, and the gateword is being hogged.

Referring to FIGS. 1–3, two processor pairs 6P, 8P and 7P, 9P are respectively depicted on two circuit boards 1, 2 with first level private caches 6C, 8C, 7C, 9C. Second level shared caches (shared cache 4 serving private caches 6C, 8C and shared cache 5 serving private caches 7C, 9C) are shown positioned between the boards 1, 2 to emphasize the delays inherent in a write-into-cache architecture. In actual systems, a shared cache is typically disposed on the same board as the processors it serves.

The term "write-into-cache" defines a caching process that saves time by avoid the need to always send newly written data words to the main memory 3. As will be discussed further below, each CPU includes a hardware anti-hogging flag and suitable means to carry out delays such as a conventional decrementable register (not shown).

In a write-into-cache environment, a newly written word is retained within the private cache of the processor that wrote it, and this is the only valid copy of the word in the memory hierarchy. All outdated copies in other processors are invalidated when the write occurs. A copy of the newly written word can be obtained by any processor using a read and siphon process. This will change the status of all copies of the newly written word from "valid, modified and owned by the processor" to "valid and modified" or "valid" depending on which board siphoned the word. "Modified" indicates that the main memory 3 does not currently have a valid copy. Main memory 3 will be routinely over-written with the modified copy, and thus updated, when the word needs to be displaced for new incoming data by a swapping operation.

Referring particularly to FIG. 1, a potential hogging conflict starts when a first processor 6P establishes ownership of a gateword 10 from main memory 3 via a system bus 11 by doing a conventional read-alter-rewrite to acquire the gateword 10. The gateword cannot later be acquired from main memory 3 as long as there is ongoing competition for the process or data whose usage is controlled by the given gateword. (The gateword is usually found first in main memory 3 as depicted in a set of circumstances leading to hogging.) Processor CPU0 6P tests the gateword, now resident in its private cache 6C, and, if allowed (not marked as already in use by another processor), will execute the gated common code or use the gated shared data which is guarded by the particular gateword.

Thus, in FIG. 2, processor 6P (CPU0) has acquired ownership of the given gateword; it has the only valid copy of the gateword, in the entire memory hierarchy system, in its private cache 6C. Shared cache 4 also has a copy, but it is marked as owned by processor 6P. Processor 6P is executing/using the protected code/data for which it has closed the gateword by writing the word with a closed data pattern.

Consider that processor 8P (CPU2) wants to access the same code/data; it must first read and test the current gateword. To gain access, it will siphon the gateword from the shared cache 4 on the internal bus 12 of the board 1 and test it. (The board 2 has a corresponding internal bus 13.) The processor 8P now has a read copy, and the processor 6P is no longer the owner. The status has been changed for the gateword in the private cache 6C, shared cache 4 and private cache 8C copies to "valid". But, processor 8P cannot yet use the protected code/data, so it loops on testing the valid copy it retains in its private cache 8C. The status will not change until the processor 6P exits the protected code/data and writes the gateword OPEN to permit use of the guarded code or data by another processor. The status of the gateword will be changed to "valid, modified and owned" again, and processor 8P can again gain access to the gateword simply by reading a copy from shared cache 4 into its private cache 8C via the board 1 internal bus 12. The access path has very short delays because there is no need to pass information through the shared caches 4, 5 via the system bus 11.

In FIG. 3: processor 6P is still using the protected code/data, and processor 8P is continuing to test the gateword. Now CPU1 7P on board 2 also needs access to this heavily used gateword. Its access path for obtaining a copy of the gateword for testing requires a much longer delay. It must siphon the data from shared cache 4, through shared cache 5 via system bus 11, while competing with any other system bus activity, then through its own private cache 7C for testing in processor 7P. After the first read, the gateword copy has been placed in processor 7P and in shared cache 5, and its status has been changed to "valid"; processor 7P which will loop reading it's own copy. At this point, the gateword is still marked CLOSED because processor 6P has not finished using the gated code/data.

When processor 6P finally finishes using the protected code/data, it will write the gateword with an OPEN data pattern. When the gateword is written, its status will changed to "valid, modified and owned" by processor 6P, and a conventional "cache invalidate" command is sent to all other processors and shared cache 5.

At this point processor 6P has the only updated copy of the gateword in its private cache 6C. Now the hogging begins. Both processor 8P on board 1 and processor 7P on board 2 undertake to acquire the gateword. However, processor 8P can siphon the word from processor 6P on the internal bus 12 of board 1 without using the system bus 11 while processor 7P's attempted siphon must go onto the system bus 11 and through the shared cache interface mechanisms of both shared caches 4, 5. Processor 8P will always win under these conditions. It will test the gateword, find it OPEN and CLOSE it before processor 7P can obtain a read copy of the gateword to test. Typically with heavily used gates, processor 6P will again be trying to acquire the same gateword, this time in competition with processor 7P, and it will win because of processor 7P's handicap in the process. So it continues until processor 7P is interrupted on its run timer and aborts the process that needs the gate.

It will be observed that a gateword protected code routine has some unique qualities. It is intended for use by one processor at a time; typically some time dependent data is being changed. The code of the gateword protected routine is short and interrupt protected with some fixed length of time that a processor can be executing in the protected code. The operating system uses gateword protected code extensively; and, as a result, multiple processors are always in contention for control of a given gateword. The gateword will be accessed repeatedly and passed from private cache to private cache with each access. Any delays to that access path imposed on a given processor versus another processor will cause an unacceptable priority where the processor with the fastest access path will hog gateword access and therefore control of the gated routine. Gateword protected data has similar characteristics.

The foregoing demonstrates the hogging problem. Now, it will be shown how an exemplary embodiment of the invention prevents hogging.

All processors have a common access point to main memory 3, with equal priority levels, and this conventional arrangement offers the possibility to eliminate the hogging problem even though slower hardware access may result. This slower access can be measured against the much larger delays experienced in attempting to correct for hogging in any other known form of software or hardware mechanism for that purpose except for that of our earlier solution discussed above and which is not practical in some operating system environments.

The exemplary embodiment of the invention is employed in the GCOS 8 operating system. Within the GCOS 8 operating system, a "Set Zero Negative and Clear" (SZNC) instruction is used to test and CLOSE an open gate by writing any value other than zero into the relevant gateword. A "Store Instruction Counter+2" (STC2) instruction is used to OPEN a gate. In the example, the STC2 instruction is provided with enhanced functionality to assist in controlling the high usage gates. (Other operating systems employing gateword control have equivalent instructions to open and close gatewords.)

After completing execution of a gated routine, the processor owning the relevant gateword executes an STC2 to OPEN the gateword to allow other processors to use it. The modified STC2 instruction of the exemplary embodiment of the invention first broadcasts a gateword interrupt to set the gateword control flags 6G, 7G, 8G, 9G and then delays for a short interval before continuing its normal execution to OPEN the gateword. After the STC2 finishes the write, it flushes the gateword from the processor's private cache and shared cache. This gateword OPEN process invalidates all copies in any cache, and the flush will force the gateword to main memory 3.

A different set of instructions are used to access a gateword. These instructions test the status of a gateword in the process of capturing it for exclusive use of the gated code. After a processor has captured the gateword, it is written with a value to indicate it is now CLOSED for access by other processors. These instructions are described in the following.

When a processor contends for a gate, it tests the gateword for an OPEN condition and CLOSEs the gateword, all within the same instruction. In the example, the test is performed by one of several read-alter-rewrite gating instructions characterized in preventing another processor from gaining access to the gateword while the read-alter rewrite is in process. (The instruction does not have to complete to allow another processor to gain access; just completing the read-alter-rewrite activity will allow access.)

Three of the most commonly used gate instructions are in the GCOS 8 operating system are: "Set Zero Negative and Clear" (SZNC), "Load AREG and Clear" (LDAC) and "Load QREG and Clear" (LDQC). These are widely used instructions with direct equivalents in most operating system to operate on the Accumulator (A) Register and the Quotient (Q) Register.

When a processor executes one of these instructions, it will test its gate control flag and, if set, delays before reading the gateword and then continue execution. The delay is necessary to ensure that the gateword has been swapped to main memory 3 by the last processor owning it, and that all processors in contention have received the gateword interrupt and have reacted to it by entering the wait condition. The processor owning the gate is also delayed while executing the STC2 instruction ensuring that all processors contending for access to the gateword have equal delays. The processor owning the gateword will also see the gateword interrupt and set its gateword control flag. If at some point after exiting the STC2, this processor encounters another gate routine using one of these instructions, it will be delayed even more to guarantee it will not hog the gateword access.

Upon sensing the gateword control flag within one of the specified instructions, a processor will wait for a sufficient period to ensure the gateword has been moved to main memory 3 by the flush action before continuing to access the gateword. The delay is fixed and thus provides a pseudo FIFO effect in that the first CPU to start into a delay will be the first to exit and access the gateword from main memory 3.

Figure 4:
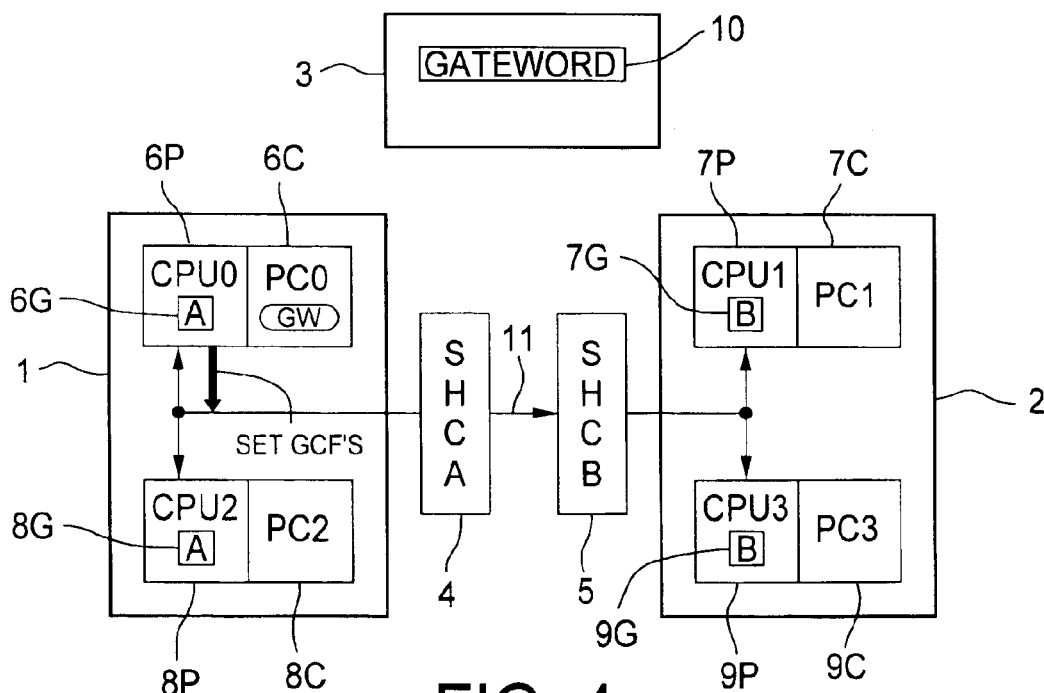
FIG. 4 is a block diagram of a multiprocessor system modified in accordance with an exemplary embodiment of the invention and showing a first operation used in establishing balanced gateword access.
Figure 5:
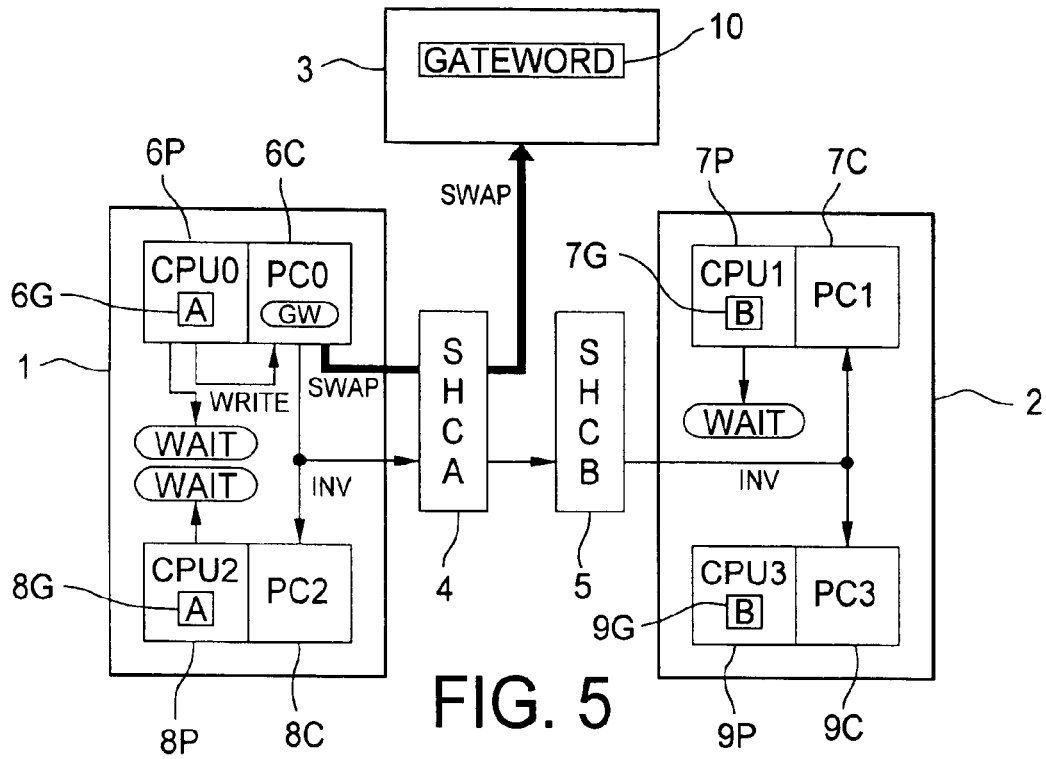
FIG. 5 is a block diagram of the exemplary multiprocessor system of FIG. 4 showing a second operation used in establishing balanced gateword access.
Figure 6:
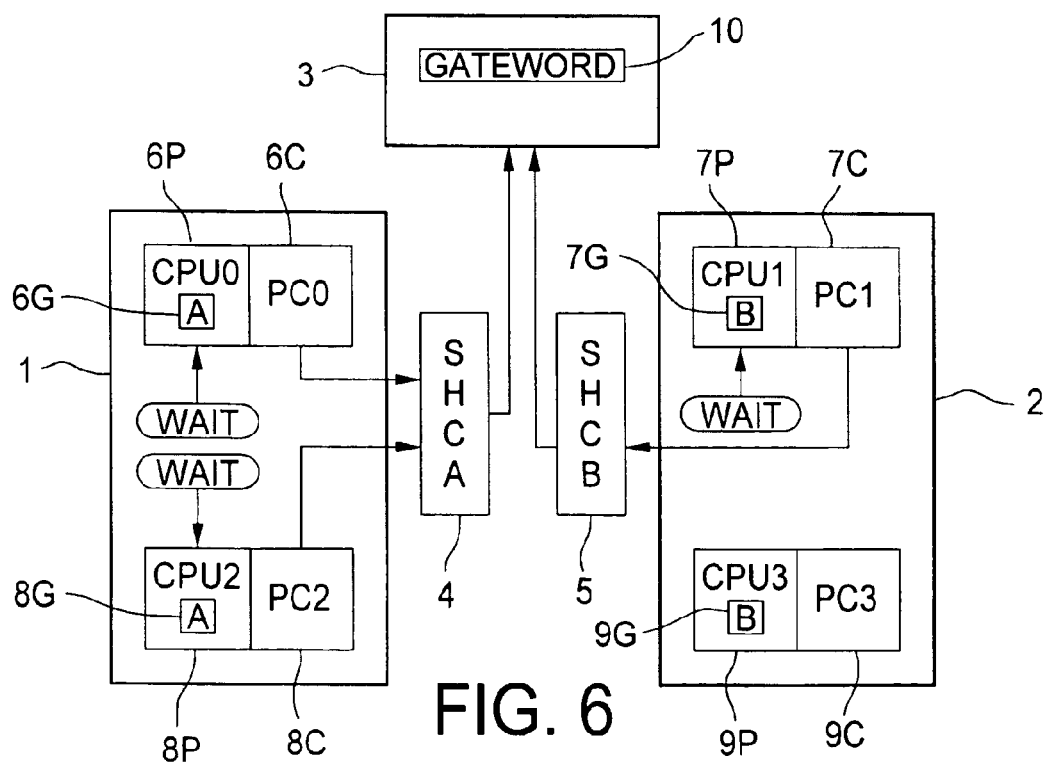
FIG. 6 is a block diagram of the exemplary multiprocessor system showing that balanced gateword access has been achieved.

FIGS. 4, 5, 6 show how the balanced gate handling of the illustrative embodiment of the invention eliminates the hogging effect discussed above in conjunction with FIGS. 1, 2, 3.

In FIG. 4, when processor 6P completes the gated routine, instead of immediately writing an OPEN value in the gateword with the STC2 instruction, it will first send out the gateword interrupt to all processors 6P, 7P, 8P, 9P to set their respective gate control flags 6G, 7G, 8G, 9G.

In FIG. 5, Those processors contending for the gate, processor 7P and processor 8P, are each actively testing the gateword with one of the gating instructions (SZNC, LDAC, LDQC in the example) and also test their individual gate control flag 7G and 8G. Finding their gate control flags set, processors 7P and 8P each enter a fixed wait period. This wait period must be sufficient, in a given system environment, for processor 6P to write the OPEN value into the gateword and then flush the gateword back to main memory 3. Processor 6P will have no need to enter into a wait period after flushing the gateword since its gate control flag is set. If processor 6P attempts to grab the gateword while the other processors are waiting, it will use one of the three exemplary gating instructions to test the gateword and also will find its gate control flag set. This condition forces processor 6P into the fixed wait period as the last entry in the pseudo FIFO, thus making it impossible to for processor 6P to get the gate next. However, if no other processors are waiting in the pseudo FIFO, then processor 6P will get the gateword next.

In FIG. 6, the gateword has been flushed and swapped to main memory 3. The pseudo FIFO resulting from the use of the fixed wait period will allow the processor requesting the gateword first to exit the internal wait loop first and acquire the gateword. The access paths to main memory 3 are equal for all processors on any board and therefore each has equivalent access delays and cannot be starved by an imbalance.

In addition to providing a gate control flag in each processor, certain existing commands in an operating system incorporating the subject invention must be modified as necessary to have the following effects and characteristics:

A command to OPEN a gateword:

a) broadcasts a gateword interrupt to set a gateword control flag in each processor running under the operating system;

b) delays long enough to ensure that the gateword control flags have all been set;

c) writes an OPEN value into the gateword which invalidates all copies in other processors; and d) flushes or swaps the gateword from the shared cache of the executing processor to force the only copy to main memory;

At least one command to access and test a gateword which:

a) checks the requesting processor's gate control flag;

b) if the gate control flag is set, delays a fixed time which is long enough to ensure that the gateword has been swapped to main memory by the last processor using it and that all processors in contention have received the gateword interrupt and have reacted to it by entering the wait condition; and c) continues normal instruction execution.

What is claimed is:

1. A multiprocessor data processing system comprising: a main memory; at least first and second shared caches coupled to said main memory by a system bus; at least first, second, third and fourth processors having respective first, second, third and fourth private caches, said first and second private caches being coupled to said first shared cache and to one another via a first internal bus, and said third and fourth private caches being coupled to said second shared cache and to one another via a second internal bus; a gate control flag incorporated into each of said first, second, third and fourth processors; a gateword stored in said main memory, said gateword governing access to common code/data shared by processes running in at least three of said processors; a gateword CLOSE command, the execution of which by a first processor establishes ownership of the gateword and prevents other processors from accessing the code/data guarded thereby until said first processor has completed its use thereof; a gateword OPEN command executed by said first processor after it has completed use of the guarded code/data, said gateword OPEN command: broadcasting a gateword interrupt to set the gateword control flag in each of said first, second, third, and fourth processors, delaying long enough to ensure that the gateword control flags have all been set, writing an OPEN value into the gateword, and flushing the shared cache of the executing processor to force the gateword to main memory; and at least one gateword access command executed by a requesting processor to: check the requesting processor's gate control flag, if the requesting processor's gate control flag is set, enter a fixed time delay, and continue normal instruction execution after completion of the fixed time delay.

2. The multiprocessor data processing system of claim 1 in which, among a plurality of requesting processors, the first to complete the fixed time delay acquires the gateword from main memory.

3. The multiprocessor data processing system of claim 1 in which a plurality of different gateword access commands compete equally for ownership of a gateword stored in main memory.

4. The multiprocessor data processing system of claim 2 in which a plurality of different gateword access commands compete equally for ownership of a gateword stored in main memory.

5. The multiprocessor data processing system of claim 1 in which a plurality of competing processors issuing said at least one gateword access command effect a pseudo FIFO in order that the first processor to complete its fixed time delay acquires the gateword.

6. The multiprocessor data processing system of claim 2 in which the plurality of competing processors issuing said at least one gateword access command effect a pseudo FIFO in order that the first processor to complete its fixed time delay acquires the gateword.

7. The multiprocessor data processing system of claim 3 in which the plurality of competing processors issuing said at least one gateword access command effect a pseudo FIFO in order that the first processor to complete its fixed time delay acquires the gateword.

8. The multiprocessor data processing system of claim 4 in which the plurality of competing processors issuing said at least one gateword access command effect a pseudo FIFO in order that the first processor to complete its fixed time delay acquires the gateword.

9. In a multiprocessor data processing system including: a main memory; at least first and second shared caches; a system bus coupling the main memory and the first and second shared caches; at least first, second, third and fourth processors having respective first, second, third and fourth private caches with the first and second private caches being coupled to the first shared cache and to one another via a first internal bus, and the third and fourth private caches being coupled to the second shared cache and to one another via a second internal bus; a method for preventing hogging of ownership of a gateword stored in the main memory and which governs access to common code/data shared by processes running in at least three of the processors; the method comprising: incorporating a gate control flag into each of the first, second, third and fourth processors; providing a gateword CLOSE command, the execution of which by a first processor establishes ownership of the gateword and prevents other processors from accessing the code/data guarded thereby until the first processor has completed its use thereof; providing a gateword OPEN command executed by the first processor after it has completed use of the guarded code/data, the gateword OPEN command: broadcasting a gateword interrupt to set the gateword control flag in each of the first, second, third, and fourth processors, delaying long enough to ensure that the gateword control flags have all been set, writing an OPEN value into the gateword, and flushing the shared cache of the executing processor to force the gateword to main memory; and providing at least one gateword access command executed by a requesting processor to: check the requesting processor's gate control flag, if the requesting processor's gate control flag is set, enter a fixed time delay, and continue normal instruction execution after completion of the fixed time delay.

10. The method of claim 9 in which, among a plurality of requesting processors, the first to complete the fixed time delay acquires the gateword from main memory.

11. The method of claim 9 in which a plurality of different gateword access commands compete equally for ownership of a gateword stored in main memory.

12. The method of claim 10 in which a plurality of different gateword access commands compete equally for ownership of a gateword stored in main memory.

13. The method of claim 9 in which a plurality of competing processors issuing at least one gateword access command effect a pseudo FIFO in order that the first processor to complete its fixed time delay acquires the gateword.

14. The method of claim 10 in which the plurality of competing processors issuing at least one gateword access command effect a pseudo FIFO in order that the first processor to complete its fixed time delay acquires the gateword.

15. The method of claim 11 in which the plurality of competing processors issuing at least one gateword access command effect a pseudo FIFO in order that the first processor to complete its fixed time delay acquires the gateword.

16. The method of claim 12 in which the plurality of competing processors issuing at least one gateword access command effect a pseudo FIFO in order that the first processor to complete its fixed time delay acquires the gateword.

* * * * *